May 21, 1968  H. L. COTTON  3,383,743
PIPE BENDING APPARATUS AND METHOD
Filed Oct. 13, 1965  2 Sheets-Sheet 1
Fig. 1
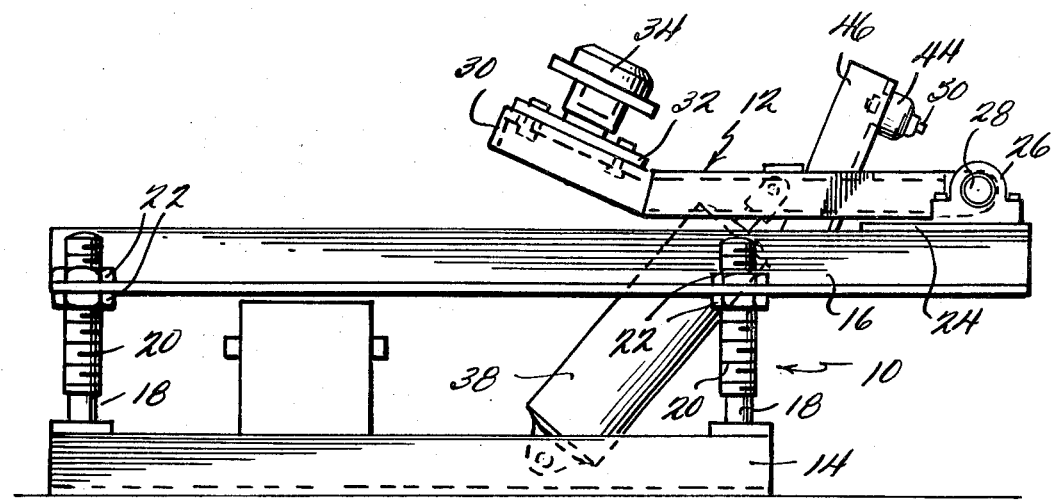
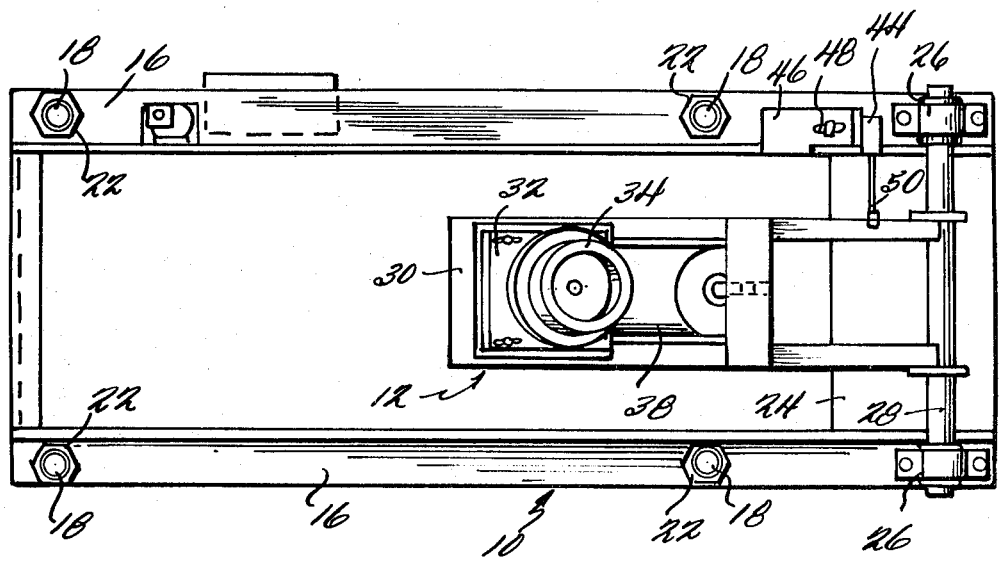
Fig. 2
INVENTOR
HERBERT L. COTTON
BY
ATTORNEYS

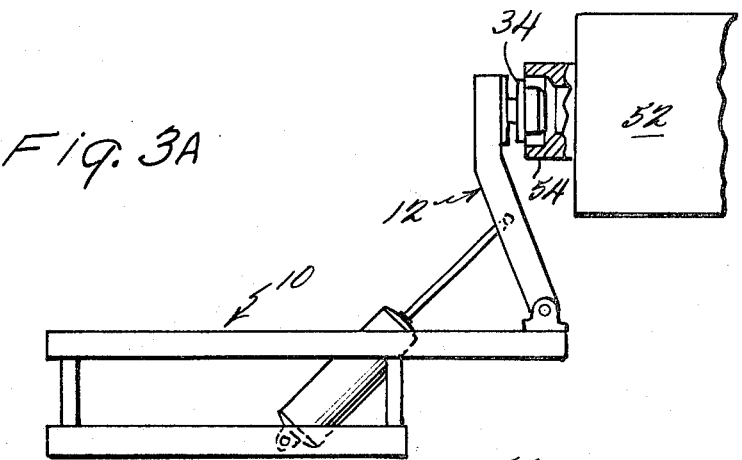
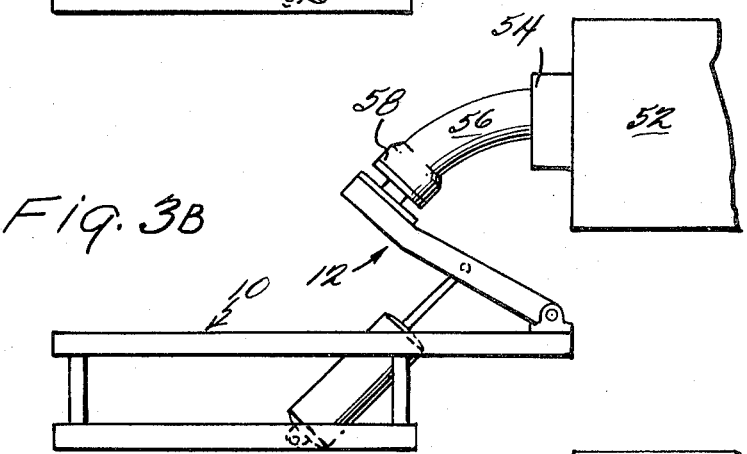
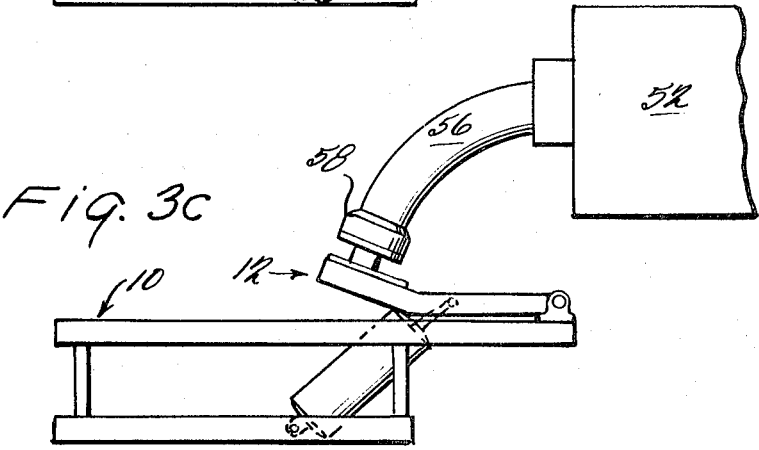

United States Patent Office 3,383,743
Patented May 21, 1968

3,383,743
PIPE BENDING APPARATUS AND METHOD
Herbert L. Cotton, Ocala, Fla., assignor to United States Concrete Pipe Company, a subsidiary of Pittsburgh Coke & Chemical Company, Pittsburgh, Pa., a company of Pennsylvania
Filed Oct. 13, 1965, Ser. No. 495,466
8 Claims. (Cl. 25—39)

ABSTRACT OF THE DISCLOSURE

An apparatus for forming curved pipe is described, and the apparatus includes a former member which contacts and grips the end of a pipe section being extruded from an extruding machine. The former member is moved in an arcuate path downwardly and away from the extruder so that the pipe section is formed into a curved pipe. The former member may be carried and moved by a frame means which is mounted to swing around a pivotal axis, carrying the former member with it. Furthermore, the frame means may be power operated and automatically controlled in its movements.

---

This invention relates to a method and apparatus for bending pipes and, in particular, relates to a method and apparatus for bending a ceramic pipe while it is being extruded in an unfired moist condition.

Clay and cement pipes are manufactured by known extruding processes and apparatus, and in a typical operation the raw material which makes up the composition of the pipe is forced through an extruding mechanism which produces a straight, hollow pipe of the desired outside and inside diameters, and then the pipe can be cut off at desired lengths as it issues from the extruder. Such extruding methods have had special application to form a straight length of clay pipe, and where it is desired to form a curved pipe section, it has been necessary to manually form a curve from a straight section or to use a separate type of apparatus which molds only curved pipe sections.

The present invention provides for a bending of straight pipe sections as they are extruded from an extruding apparatus. The device of this invention is used in combination with known extruding apparatus and provides for a pre-set radius of curvature for a desired length of curved pipe. The apparatus is simple in structure and ruggedly built for low maintenance in use, and it eliminates prior manual steps required to manufacture curved pipe sections. Additionally, the apparatus of this invention provides for a greater uniformity of product than has been possible with conventional manual methods of bending pipe sections.

The pipe bending apparatus of this invention includes a base frame which can be positioned adjacent to a pipe extruding apparatus, and the base frame supports a second frame or arm which is movable relative to the base frame and which forms a pipe section into the desired radius of curvature. The second frame section is pivoted at a first end in its attachment to the base frame so that the opposite end can be swung in an arc about the pivot point. A power operated moving means is included between the base frame and the movable frame for swinging the movable frame about the pivotal attachment. The free end of the movable frame is adapted to carry a socket former member which is placeable against the extrusion apparatus so as to receive an end of clay pipe being extruded from the latter. The former member forms a shoulder on the end of the clay pipe and also grips the end of the issuing pipe so as to carry it through a pre-selected arc as it issues from the extruder apparatus. The pre-selected arc is determined by the length of the movable frame and the position of the former member on its free end relative to the pivot point of that frame. Thus, as moist clay pipe is extruded from the extruder apparatus, it is carried downwardly and away from the apparatus in a designated path of movement which forms a curve in a length of the issuing pipe. The curved section can then be cut off from the extruder at a desired length and processed with further steps of finishing, drying and burning.

Other features and advantages of this invention will become apparent in the more detailed discussion which follows, and in that discussion reference will be made to the accompanying drawings in which:

FIGURE 1 is an elevational view of the curve bending apparatus and illustrating the base frame and movable frame portions associated with the apparatus;

FIGURE 2 is a top plan view of FIGURE 1; and

FIGURES 3a–c illustrate a sequence of movements for a curve bending operation with the apparatus of this invention. FIGURE 3a illustrates the position of the movable frame portion relative to an extruder apparatus at the beginning of an extrusion bending operation and FIGURES 3b and c illustrate subsequent steps in the bending operation.

With reference to FIGURES 1 and 2, the curve bending apparatus is illustrated as having a base frame 10 which supports a separate movable frame or arm 12. The base frame can be made in any desired form which will provide sufficient stability and support for the movable frame portion when the bending operation is taking place. The base frame 10 is shown as being made up from a number of metal frame elements which form a rectangular structure, as illustrated. A floor engaging portion 14 of the frame may be made from angle iron having an L-shaped cross section. An upper deck section 16 is carried over the floor engaging section and is connected to the same by the support columns 18. The support columns may also be made from sections of angle iron, but are preferably in the form of support rods having external threads 20 so that the upper deck section 16 may be adjusted relative to the floor engaging section 14. Nut members 22 are fitted over the threaded upper ends of the support columns 18 so as to position the upper deck relative to the floor engaging section 14. One end of the base frame 10 includes a mounting plate 24 for supporting one end of the movable frame or arm 12. The movable frame 12 is pivotally attached to the base frame 10 so that one end of the movable frame 12 is free to swing in an arc about the pivotal attachment point of the frame 12 to the base frame 10. The means for pivotally attaching the movable frame section 12 to the base frame is shown in the form of upright bearing blocks 26 which support a horizontally disposed pivot member carried by the movable frame section. The pivot member 28 is in the form of a metal rod which is rigidly secured to a lower end of the movable frame 12, and the rod 28 is journaled at its opposite ends within the bearing blocks 26. Thus, the movable frame 12 is free to swing around the point of pivotal attachment defined by the longitudinal axis of the rod 28.

The movable frame or arm 12 is of a suitable length to define the required radius curvature for a pipe section which is being formed. The free end 30 of the movable frame is adapted to be positioned adjacent to a pipe extruding apparatus so as to receive the end of a pipe being extruded. For this purpose, the free end 30 of the movable frame 12 is provided with a mounting plate 32 which carries a former member 34 for engaging the open end of an extruded pipe section. The mounting plate 32 includes slots therethrough which are aligned with the longitudinal axis of the movable frame or arm 12 so that a former member may be adjustably positioned at a desired distance from the pivot point of the movable frame 12. The former member 34 is of a conventional design and is of a shape which will form a bell or socket on the end of an extruded pipe. The former member has dimensions which will cause the extruded pipe end to bell out and to form an enlarged socket, and the former 34 acts in cooperation with an annular forming member associated with the extruder device. A power operated means 38 is interposed between the base frame 10 and the movable frame 12 so as to lift and lower the movable frame relative to the base frame. The power operated means includes a piston and cylinder system which can be fluid actuated to extend and retract the piston means relative to the cylinder means. Preferably the power operated means 38 is air operated but other fluids may be used, such as hydraulic fluid. The lower ends of the cylinder may be mounted to a portion of the base frame 10 and a connecting shaft carried by the movable piston is connected to the movable frame 12. In addition, fluid supply conduits are connected to the cylinder to provide the necessary actuation to the piston within the cylinder, and such actuating means are well known in the art and not a part of the present invention.

The curve bending apparatus also includes a limit switch means 44 which is adjustably mounted on the end of a support arm 46 carried by the base frame 10. The limit switch 44 can be raised and lowered in a slot 48 through the end of the support arm 46, and in this manner, the switch can be set at varying heights to contact the movable frame 12 as it is descending from its upright position. The limit switch and its contact arm 50 are of conventional design, and can be included in suitable circuiting for stopping and starting movements of the power operated means 38. With this arrangement, the movable frame 12 can be stopped at a pre-selected level in its travel downwardly away from the end of an extruder apparatus, and this feature provides for the automatic stopping of the curve bender when a desired length of pipe has been formed.

The operation of the curve bending apparatus is illustrated in FIGURES 3a through 3c. FIGURE 3a illustrates the position of the movable frame or arm 12 relative to an extruder 52 at the beginning of a curve bending operation. The movable frame 12 is in an upright position so as to place the former member 34 into alignment with a die former 54 mounted on the end of the extruder 52. The former member 34 and the die 54 are constructed to cooperate with each other to form a bell or socket in the end of a moist clay pipe issuing from the extruder apparatus. The die former 54 is in a conventional annular shape of such a size to receive the former member 34 within an annular recess defined by the former 54. When the two members 34 and 54 are brought together, a clay pipe 56, which is being extruded from the extruding apparatus, is forced to follow the contours of the former members, and in this manner a socket 58 is formed on the end of the pipe, as illustrated.

As the moist clay pipe issues from the extruder, the movable frame 12 is actuated to slowly move downwardly and away from the extruder at a rate which is compatible with the extruding rate of the extruder. Thus, as the pipe is forced outwardly from the extruding apparatus, the movable frame 12 carries the end of the pipe downwardly and outwardly from the extruder so as to form a pre-selected arc in the pipe section. FIGURE 3b illustrates an intermediate position of the movable frame 12 relative to the clay pipe issuing from an extruder apparatus and FIGURE 3c shows the final position for the movable frame 12 after a curve has been formed in a desired length of pipe.

In the final step of the process, the clay pipe 56 has been formed with a selected curve in the pipe section, as determined by the arcuate path of movement from the former member 34. Additionally, the clay pipe segment includes the socket 58 at its end and this socket is adapted to receive the end of an adjoining segment of pipe when such pipes are installed in a conventional usage of the same. The apparatus for bending the curve in the pipe can be automatically controlled with suitable valving and timing devices to cause the movable frame member 12 to go through the series of steps necessary for receiving and bending the end of a clay pipe. Additionally, the switch means 44 which is contacted by a downward movement of the frame or arm member 12 can stop continued movement of the frame 12 at a desired level so that the curved section of pipe can be cut off from the extruder at a pre-selected length. The means for cutting the pipe can be automatically controlled by the switch means 44 which stops the movement of the frame 12 and such an automatic control would cause a cutting device to move across the diameter of the pipe in the region of extruding apparatus so as to cut the pipe away from the extruder. In the preferred form of this invention, the movable frame member is actuated by air pressure which is applied to a power operated bellows 38 or other extendable and retractable member 38. The movements of the frame 12, to its starting position and to all subsequent pipe bending positions, are controlled by valving and switching devices which limit the upright position of the frame and which stop the downward movement of the frame at a selected point.

After the pipe segment has been curved and cut away from the extruder, it is then conveyed to another location for further finishing treatments and final burning. On removal of the pipe segment from the extruder, the movable frame or arm 12 can immediately resume an upright initial position, as in FIGURE 3a, to initiate a bending operation on a new pipe segment issuing from the extruder apparatus.

In a typical extruding and bending operation clay pipe material having a moisture content of from 14% to 18% is extruded as a pipe section from an extruding apparatus. The former member 34 is placed in an upright position so as to receive an extruded end of the pipe and to form the same into a bell socket, as described above. The former member is moved through an arcuate path as determined by the movement of the frame 12 about its pivot point 28. The pivot point is preferably adjustable in its relationship to the base frame so that its position relative to the extruder apparatus may be varied. By adjusting the pivotal point or the length of the movable frame member 12 it is possible to make curves having radii of 22½ degrees, 30 degrees, 45 degrees, or any other required curvature. The length of the curved section can be varied in a commercial operation from as short as 12 inches to as long as 24 inches depending upon the set length for the automatic cutoff of a curved extruded section. The curve forming apparatus is typically used with extruders producing pipe sections having 4 inch and 6 inch diameters but the apparatus can be adjusted to accommodate larger pipe diameter sizes.

Having now described the invention and the method of its use, it can be seen that it provides for an automatic and rapid production of uniformly shaped curved pipe segments. Prior to the invention it has been necessary to curve pipe sections manually and the resulting products have not been adequately uniform in exact shape or curvature. The present invention can be adapted to form curved pipe segments of varying radii of curvature by adjusting the position of the former member 34 or by utilizing a frame member 12 having a different length. Additionally, the pipe bending apparatus of this invention can be used with extruders which form varying diameters of pipe, and the overall length of the curved section can be adjusted to meet market specifications. Also, it is contemplated that pipe sections may be formed and curved without the formation of a bell or socket on the end of the pipe.

Where no bell or socket is to be formed, a former member 34 would be used which would fit completely within the normal diameter of the pipe being extruded.

Although this invention has been described with reference to a particular embodiment, variations will become obvious to those skilled in the art and such variations are included within the scope of the invention.

What is claimed is:
1. An apparatus for bending pipe into curves which is being extruded from an extruding device comprising:
    a former member for contacting and gripping the end of a straight pipe being extruded from said extruder device, and
    means for moving said former member downwardly and away from said extruder in an arcuate path so as to carry and bend said straight pipe into a curve as determined by the arcuate path of movement of the former member.

2. The apparatus of claim 1 wherein said moving means includes a movable frame means, said frame means having a first end which is pivotally attached to a base frame and a second end which is free to move about the point of pivotal attachment.

3. The apparatus of claim 2 wherein said former member is carried by the second end of said movable frame, whereby the former member can be swung in an arcuate path determined by the position of said former member relative to said point of pivotal attachment.

4. The apparatus of claim 2 wherein said former member is adjustably carried by said second end of said movable frame for adjustable movement along the longitudinal axis of said movable frame, whereby the angle of curvature of the pipe can be determined by adjusting the distance said former member is located from the point of pivotal movement of said movable frame.

5. The apparatus of claim 2 and including power operated means for lifting and lowering said movable frame means relative to said base frame whereby the free end of said frame travels in an arcuate path about said point of pivotal attachment upon actuation of said power operated means.

6. The apparatus of claim 5 wherein said power operated means comprises a fluid actuated piston and cylinder means connected between said base frame and said movable frame, whereby said piston can be extended and retracted within said cylinder by fluid pressure so as to move said movable frame.

7. The apparatus of claim 6 and including automatic control means for actuating said power operated means whereby the amount of movement of the movable frame can be automatically started and stopped for the curve bending operation.

8. The apparatus of claim 7 wherein said automatic control means includes a contact switch means which can be adjusted to stop said movable frame at varying levels in its downward movement away from the extruder apparatus.

References Cited
UNITED STATES PATENTS

| | | | |
|---|---|---|---|
| 2,502,247 | 3/1950 | Clark et al. | 25—39 |
| 2,649,642 | 8/1953 | Petresky | 25—39 |
| 2,751,658 | 6/1956 | Gibboney | 25—39 |
| 1,558,030 | 10/1925 | Martin | 25—39 |
| 975,062 | 11/1910 | Myers | 25—39 |
| 2,508,293 | 5/1950 | Powell | 25—39 XR |

WILLIAM P. STEPHENSON, *Primary Examiner.*

Notice of Adverse Decision in Interference

In Interference No. 97,178 involving Patent No. 3,383,743, H. L. Cotton, PIPE BENDING APPARATUS AND METHOD, final judgment adverse to the patentee was rendered Mar. 6, 1972, as to claims 1, 2 and 3.

[*Official Gazette August 22, 1972.*]